United States Patent [19]

Harast

[11] Patent Number: 4,572,939

[45] Date of Patent: Feb. 25, 1986

[54] BRAZING TECHNIQUE

[75] Inventor: Donald G. Harast, Idaho Falls, Id.

[73] Assignee: The United States of America as represented by the United States Department of Energy, Washington, D.C.

[21] Appl. No.: 574,504

[22] Filed: Jan. 27, 1984

[51] Int. Cl.⁴ ............................................. B23K 1/20
[52] U.S. Cl. ............................. 219/85 M; 219/85 R; 228/203
[58] Field of Search ................ 219/85 A, 85 M, 85 R, 219/85 H; 228/203

[56] References Cited

U.S. PATENT DOCUMENTS

| | | | |
|---|---|---|---|
| 798,332 | 8/1905 | Green et al. | 228/203 X |
| 3,121,948 | 2/1964 | Hollander et al. | 29/470.3 |
| 3,421,677 | 1/1969 | Jenkins | 228/203 |
| 4,025,035 | 5/1977 | Jonason | 228/185 |
| 4,270,986 | 6/1981 | Smith | 219/85 R X |

FOREIGN PATENT DOCUMENTS 651913 3/1979 U.S.S.R. .............................. 228/203

OTHER PUBLICATIONS

Cary, Howard B. *Modern Welding Technology*, 1979, pp. 197–205.

Primary Examiner—C. L. Albritton
Assistant Examiner—Catherine M. Sigda
Attorney, Agent, or Firm—William Lohff; Jeannette M. Walder; Judson R. Hightower

[57] ABSTRACT

A method of brazing comprises sand blasting the surfaces of the components to be brazed with particles of a brazing material to clean the surfaces and to embed brazing material in the surfaces, applying the brazing material to the surfaces, and heating the brazing material to form a brazement between the components.

10 Claims, No Drawings

BRAZING TECHNIQUE

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to an improved brazing technique. Brazing is one of the general groups of welding processes, where welding is a method of joining metals by fusion or by solid-state processes. A weld is defined as the localized coalescence of metal wherein coalescence is produced by heating to suitable temperatures, with or without the application of pressure, and with or without the use of filler metal. Brazing involves the use of a filler metal having a lower melting point than that of the metals being joined. In brazing, coalescense is produced by heating. The non-ferrous filler metal used has a melting point below that of the metals being joined, so that upon heating the filler metal is distributed in the joint to be brazed by capillary attraction. Cleaning of the joints is essential for satisfactory brazing.

In brazing it is necessary to remove rust, grease, scale, etc., from the surfaces of the joint for proper distribution of the brazing material by capillary attraction. Joints are commonly cleaned chemically, such as with solvents and by electropolishing, and mechanically, such as with abraiding wheels, buffers, and sand blasting. The sand blasting consists of particles of hard granular material blown by a jet of compressed gas against a hard surface which it is desired to abrade. Certain types of joints are difficult to clean properly and require repeated attempts before a successful brazement is obtained. The problem of cleanliness becomes more critical when the joint to be brazed must be mechanically sound and leak tight. For example, joints formed between stainless steel components and thermocouples used diagnostically on reactors must be mechanically sound and leak tight to $2 \times 10^{-9}$ std cc/sec of helium. Existing cleaning procedures cannot be used to obtain the required brazements.

Therefore, it is an object of the present invention to provide an improved brazing technique that achieves mechanically sound, leak tight joints.

It is another object of the present invention to provide an improved method of cleaning and preparing joint surfaces for brazing.

It is yet another object of the present invention to provide a method of obtaining mechanically sound, leak tight joints between stainless steel components.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention, a method of brazing components may comprise the steps of: sand blasting the components with particles of a brazing material to clean the surfaces of the components and to embed brazing material in the surfaces; applying the brazing material to the components' surfaces; and heating the brazing material to form a brazement between the components.

Several advantages are obtained by sand blasting the joint surfaces with the brazing material prior to brazing. Cleaning is done by a material that is not foreign (the presence of foreign material may repel or negate the capillary attraction of the braze). If a portable or miniature air-brush-type sand blaster is used, cleaning can be done in hard to reach places. And, trace amounts of the brazing material are left embedded in the surfaces of the joint to be brazed. This, in effect, "pre-tins" the surface prior to brazing.

DETAILED DESCRIPTION OF THE PREFERRED EMBODIMENT

The sodium test loop at EBR-II (Experimental Breeder Reactor II) requires many complex stainless steel components having brazed joints. These joints must be mechanically stable and must be leak tight to the order of $2 \times 10^{-9}$ std. cc/sec helium. The following brazing technique was used to obtain the required brazements:

1. The components to be brazed were cleaned with a solvent: typically Freon TF (Freon 113, $CCl_2FCClF_2$) and alcohol.

2. This was followed by electropolishing in a solution, by volume, of 22.5% $H_2O$, 65% $H_3PO_4$, and 12.5% $H_2SO_4$.

a. For stainless steel sheathed leads, the DC power supply was 9 volts. The lead is inserted into the solution with the ground to the stainless steel container and the positive to the item being electropolished. The area of the lead to be electropolished is inserted at a rate that takes about one second to cover the brazing area and one second to remove. The lead is then rinsed in water.

b. For larger components, the DC power supply is 12 volts. The component is left in solution for a longer period of time until it appears visually bright and shiny. This is followed by rinsing in water.

3. After electropolishing, the components are thoroughly rinsed with demineralized water followed by alcohol.

4. The areas to be brazed are then sand blasted with powdered brazing material. For small areas, a miniature air-brush type sand blaster is used. Sand blasting cleans the area and embeds particles of brazing material in the joint surfaces.

5. Brazing material is then applied to the joint.

6. For inductive brazing, the joint is sealed in an air-tight quartz tube. Argon is circulated to purge the tube and $H_2$ for reduction of stainless steel oxides.

7. Brazing is completed in accordance with any known technique.

For stainless steel components, the brazing material used was NicroBraze LM (Nicrobraze LM is a trademark of the Wall Colmonoy Corp. and contains by composition: 7% Cr, 3% Fe, 2.9% B, 4.5% Si, maximum of 0.1% C, and the balance Ni.) or NicroBraze 30 (Nicrobraze 30 is a trademark of the Wall Colmonoy Corp. and contains by composition: 19% Cr, 10.2% Si, and the balance Ni.) powder. The air-brush sand blaster used Argon gas regulated to 45 psig. The size of the particles is limited only by whatever the sand blaster will handle.

Using this technique, several thermocouples were brazed to a stainless steel holding tube. The brazements obtained were successful without having to repeat the procedures. All the brazements met the helium leak test requirement and were mechanically stable.

The foregoing has been shown by way of example, only. It is clear to one skilled in the art that the method can be applied to improve any brazement.

The embodiments of this invention in which an exclusive property or privilege is claimed are defined as follows:

1. A method of brazing components comprising the steps of:

sand blasting the components with particles of a brazing material to clean the surfaces of the components and to embed brazing material in the surfaces;

applying the brazing material to the components' surfaces; and heating the brazing material to form a brazement between the components.

2. The method of claim 1 further comprising the step of electropolishing the component surfaces prior to sand blasting.

3. The method of claim 2 wherein said heating is produced by induction.

4. A method of brazing components comprising the steps of:

(a) cleaning the components' surfaces with a solvent;

(b) electropolishing the components' surfaces;

(c) sand blasting the components' surfaces with particles of a brazing material to clean the components' surfaces and to embed brazing material in the components' surfaces;

(d) applying the brazing material to the components; and (e) heating the brazing material by induction to form a brazement between the components.

5. The method of claim 4 wherein said components are stainless steel.

6. The method of claim 5 wherein said brazing material is a nickel-based powder containing about 7% Cr, 3% Fe, 2.9% B, 4.5% Si; a maximum of 0.1% C and the balance Ni.

7. The method of claim 5 wherein said brazing material is a nickel-based powder containing 19% Cr, 10.2% Si and the balance Ni.

8. The method of claim 6 wherein the electropolish solution is a mixture, by volume, of 22.5% $H_2O$, 65% $H_3PO_4$, and 12.5% $H_2SO_4$.

9. The method of claim 8 further comprising the step of rinsing the electropolished surfaces with deminerialized water followed by cleaning with a solvent prior to sand blasting.

10. The method of claim 9 wherein the solvent used is $CCl_2FCClF_2$ and alcohol.

* * * * *